C. W. HARVEY.
Bag-Fastener.

No. 160,591.

Patented March 9, 1875.

WITNESSES:
A. W. Almquist
A. F. Terry

INVENTOR:
Charles W. Harvey
BY
Munn & Co.
ATTORNEYS.

UNITED STATES PATENT OFFICE.

CHARLES W. HARVEY, OF WATERLOO, IOWA.

IMPROVEMENT IN BAG-FASTENERS.

Specification forming part of Letters Patent No. 160,591, dated March 9, 1875; application filed February 5, 1875.

*To all whom it may concern:*

Figure 1:
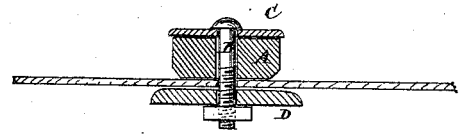
Figure 2:
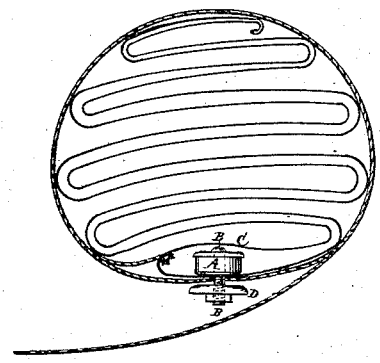

Be it known that I, CHARLES W. HARVEY, of Waterloo, Black Hawk county, Iowa, have invented a new and useful Improvement in Bag-Fasteners, of which the following is a specification:

Figure 1 is a detail section of my improved bag-fastener; and Fig. 2 is a side view of the same, illustrating its use.

Similar letters of reference indicate corresponding parts.

My invention has for its object to furnish an improved bag-fastener, simple in construction, easily applied, and convenient and reliable in use.

The invention consists of an improved bag-fastener, formed by the combination with each other of a rubber block, a screw, and two metallic washers, as hereinafter fully described.

A is a rubber block, of any desired or convenient size, shape, and thickness, and the edges of which may be beveled or not, as may be desired. Through the center of the block A is passed a screw, B, which also passes through the center of the metallic washers C D. The inner washer C is made of the same diameter as the rubber block A, or it may be made a little smaller than said block to give a little more elasticity to the outer part of the rubber. The outer washer D may have its edges beveled, or it may have its edges slightly flared.

In applying the fastener to a bag, the outer washer D is removed, the screw B is passed through the body of the bag to be fastened from the inner side, the washer D is then put on, and the nut is screwed upon the screw. One end of the string to be used is designed to be attached to the bag near the fastener A B C D.

In using the fastener the mouth of the bag is gathered in the usual way, the string is passed one or more times around it, and is then passed once or twice around the outer washer D, and is drawn in between the said washer D and the body of the bag, where the elasticity of the rubber A will hold it securely in place.

If desired, two rubber blocks, A, may be placed upon the screw B, between the washers C D, in which case the body of the bag should be interposed between the two blocks A.

By connecting the rubber block or blocks A and the washers C D by a screw, B, the fastener is enabled to be conveniently attached to and detached from the bag, and is also enabled to be readily adjusted to receive a larger or smaller string, the nut of the screw B enabling the tension of the rubber to be readily adjusted, as required.

Having thus described my invention, I claim as new and desire to secure by Letters Patent—

An improved bag-fastener, formed by the combination, with each other, of a rubber block, A, a screw, B, and two metallic washers, C D, substantially as herein shown and described.

CHARLES W. HARVEY.

Witnesses:
JAMES T. GRAHAM,
C. SEDGWICK.